(12) United States Patent
Skweres et al.

(10) Patent No.: US 10,543,827 B2
(45) Date of Patent: Jan. 28, 2020

(54) SYSTEM FOR ACCESSING INTEGRAL PRESSURES OF BRAKE CONTROL VALVE

(71) Applicant: Westinghouse Air Brake Technologies Corporation, Wilmerding, PA (US)

(72) Inventors: Jeffrey B. Skweres, McKeesport, PA (US); Michael S. Plechey, Jeannette, PA (US)

(73) Assignee: WESTINGHOUSE AIR BRAKE TECHNOLOGIES CORPORATION, Wilmerding, PA (US)

(*) Notice: Subject to any disclaimer, the term of this patent is extended or adjusted under 35 U.S.C. 154(b) by 41 days.

(21) Appl. No.: 15/691,183

(22) Filed: Aug. 30, 2017

(65) Prior Publication Data
US 2019/0061731 A1     Feb. 28, 2019

(51) Int. Cl.
| | | |
|---|---|---|
| *B60T 17/22* | (2006.01) | |
| *B60T 15/36* | (2006.01) | |
| *B60T 17/04* | (2006.01) | |
| *B60T 15/42* | (2006.01) | |
| *B60T 15/30* | (2006.01) | |
| *B60T 15/18* | (2006.01) | |
| *B60T 15/02* | (2006.01) | |

(52) U.S. Cl.
CPC .......... *B60T 17/228* (2013.01); *B60T 15/021* (2013.01); *B60T 15/184* (2013.01); *B60T 15/302* (2013.01); *B60T 15/36* (2013.01); *B60T 15/42* (2013.01); *B60T 17/04* (2013.01)

(58) Field of Classification Search
CPC ........ B60T 15/021; B60T 15/36; B60T 15/42; B60T 15/184; B60T 15/302; B60T 17/04; B60T 17/228; B60T 2270/406; B60T 13/406; B61H 9/00

USPC .......................................................... 303/28
See application file for complete search history.

(56) References Cited

U.S. PATENT DOCUMENTS

| | | | |
|---|---|---|---|
| 1,632,756 A * | 6/1927 | Campbell ............. | B60T 15/306 303/38 |
| 3,872,711 A | 3/1975 | Atkinson et al. | |
| 4,033,632 A * | 7/1977 | Wilson ................... | B60T 15/18 303/74 |
| 4,156,864 A | 5/1979 | Ingram | |
| 4,847,770 A | 7/1989 | Kane et al. | |
| 5,335,974 A | 8/1994 | Klink | |
| 5,451,099 A * | 9/1995 | Hart ....................... | B60T 15/42 285/63 |

(Continued)

*Primary Examiner* — Robert A. Siconolfi
*Assistant Examiner* — San M Aung
(74) *Attorney, Agent, or Firm* — Christopher R. Carroll; The Small Patent Group, LLC

(57) ABSTRACT

A distributor valve for a brake control system of a railway vehicle is provided with an access interface that includes a plurality of access ports for measuring the operational pressures of the distributor valve. The distributor valve includes a pipe bracket and a main line and main portions mounted on the pipe bracket. The pipe bracket includes a plurality of passages for communicating the main portion and the main line portion with each other and with a brake pipe, brake cylinder, and reservoir of the brake control system. The plurality of access ports of the access interface includes ports in communication with the working chamber passage, valve chamber passage, brake pipe passage, reservoir passage, and the brake cylinder passage of the pipe bracket.

21 Claims, 11 Drawing Sheets

(56) References Cited

U.S. PATENT DOCUMENTS

| | | | |
|---|---|---|---|
| 5,480,218 A * | 1/1996 | Hart | B60T 15/42 |
| | | | 137/594 |
| 5,503,011 A | 4/1996 | Hart et al. | |
| 5,509,727 A | 4/1996 | Hart et al. | |
| 5,559,281 A | 9/1996 | McKay et al. | |
| 5,592,384 A | 1/1997 | Wolf | |
| 5,634,696 A | 6/1997 | Hart et al. | |
| 5,695,258 A | 12/1997 | Reid et al. | |
| 5,709,436 A | 1/1998 | Scott | |
| 5,717,134 A | 2/1998 | Schlichenmaier et al. | |
| 5,744,707 A | 4/1998 | Kull | |
| 5,808,909 A | 9/1998 | Rees | |
| 5,866,811 A | 2/1999 | Skantar | |
| 5,869,754 A | 2/1999 | Scott et al. | |
| 5,952,566 A | 9/1999 | Scott et al. | |
| 5,988,766 A | 11/1999 | McCurdy, Jr. | |
| 6,079,260 A | 6/2000 | Hart | |
| 6,086,163 A | 7/2000 | Klink et al. | |
| 6,186,600 B1 * | 2/2001 | Scott | B60T 15/184 |
| | | | 137/884 |
| 6,227,625 B1 | 5/2001 | Gaughan | |
| 6,269,682 B1 | 8/2001 | Vaughn | |
| 6,837,550 B2 | 1/2005 | Dougherty et al. | |
| 6,883,874 B2 | 4/2005 | McCurdy, Jr. et al. | |
| 7,647,816 B2 | 1/2010 | Vaughn | |
| 8,707,775 B2 | 4/2014 | Semones et al. | |
| 9,901,324 B2 * | 2/2018 | Cho | A61B 8/5207 |
| 2011/0232370 A1 * | 9/2011 | Sauter | B60T 17/04 |
| | | | 73/39 |

\* cited by examiner

SYSTEM FOR ACCESSING INTEGRAL PRESSURES OF BRAKE CONTROL VALVE

BACKGROUND OF THE INVENTION

Field of the Invention

The present invention relates generally to a distributor valve for a brake control system of a railway vehicle. In particular, the present invention relates to a distributor valve having an access interface for accessing the operation pressures of the distributor valve to perform automated testing diagnostics on the distributor valve.

Description of Related Art

Railway vehicles in Russia utilize brake control systems incorporating a distributor valve having a pipe bracket (or chamber), a main portion, and a main line portion. The brake control system utilizes five different operating pressures for proper operation of the entire distributor valve unit. These five operating pressures are working chamber, valve chamber, brake pipe, reservoir, and brake cylinder. Currently, there are mainly three models of distributor valves in use in brake control systems of all Russian freight railway vehicles: the 483A-03, the 483A-05, and the KAB60-01.

Current Russian standards for testing the efficacy of the brake control system and the distributor valve only require that a manual single car test be performed on a freight car when a new OEM distributor valve is mounted to a freight car or when the complete distributor valve unit is replaced with a complete re-conditioned valve unit. The testing is performed using a manually controlled testing device that only accesses the brake pipe pressure and manually monitors both the brake pipe and brake cylinder pressures with analog gauges to check for proper operation of the distributor valve. The distributor valve is not provided with any means or mechanism for accessing all five of the operational pressures of the distributor valve while the distributor valve is in use. Testing cannot be performed automatically and cannot be performed during the service life of the distributor valve. The inability to provide a single car test of the distributor valve during its service life significantly increases the risk of improper distributor valve functionality going unnoticed while the distributor valve is in use.

In the United States, solutions exist for accessing the operational pressures of the control valve for a brake control system of a railway freight vehicle. For instance, U.S. Pat. No. 5,480,218 to Hart et al. describes a control valve, such as the AB, ABDW, DB-60, or ABDX models, having an integrally formed access plate on the pipe bracket portion for accessing the operational pressures of the control valve: brake pipe, brake cylinder, emergency reservoir, auxiliary reservoir, and optionally, the quick action chamber. A testing device for automatically and regularly testing the operational pressures of the control valve is also described. U.S. Pat. No. 5,480,218 is hereby incorporated by reference as if set forth herein in its entirety.

U.S. Pat. No. 5,451,099 to Hart et al. describes a pressure access plate that can be mounted between the pipe bracket portion and the emergency portion or the service portion of the control valve for a brake control system of a railway freight vehicle. The access plate includes a face having ports in communication with integrally formed segregated chambers that communicate the passages of the pipe bracket portion with corresponding passages of the emergency portion or the service portion. The access plate allows for access to the operation pressures of the control valve: brake pipe, brake cylinder, emergency reservoir, auxiliary reservoir, and optionally, the quick action chamber. The access plate allows for existing control valves, such as the ABD, ABDW, DB-60, and the ABDX models, to be retrofitted to provide the capability of regular and automatic testing. A testing device for automatically and regularly testing the operation pressures of the above-mentioned control valves is also described. U.S. Pat. No. 5,451,099 is hereby incorporated by reference as if set forth herein in its entirety.

SUMMARY OF THE INVENTION

Generally, provided is a replacement pipe bracket for a distributor valve or a pressure access plate for providing direct access to the five operational pressures used in the distributor valves of Russian brake control systems. The provided distributor valve or pressure access plate provides a means for easy access, monitoring, and manipulation of the functioning of the distributor valve to allow for regular testing of the distributor valve during its service life using an automated testing device. The pipe bracket of the distributor valve is provided with an integral access plate for accessing the five required operating pressures.

In accordance with one example of the present disclosure, a distributor valve for a brake control system of a railway vehicle is provided. The distributor valve is connected to a brake pipe, a brake cylinder, and a reservoir of the brake control system. The distributor valve includes a pipe bracket, a main portion mounted on the pipe bracket, and a main line portion mounted on the pipe bracket. The pipe bracket includes a plurality of passages defined therein and extending through the pipe bracket, the plurality of passages being configured to place the main portion and the main line portion in communication with each other and with the brake pipe, the brake cylinder, and the reservoir. The plurality of passages includes a working chamber passage configured to place the main portion in communication with the main line portion, a valve chamber passage configured to place the main portion in communication with the main line portion, a brake pipe passage configured to place the main portion and the main line portion in communication with the brake pipe, a reservoir passage configured to place the main portion in communication with the reservoir, a brake cylinder passage configured to place the main portion and the main line portion in communication with the brake cylinder, and at least one additional passage configured to place the main portion and the main line portion in communication with each other. The pipe bracket further includes an access interface including a plurality of access ports, the plurality of access ports including an access port connected to the working chamber passage, an access port connected to the valve chamber passage, an access port connected to the brake pipe passage, an access port connected to the reservoir passage, and an access port connected to the brake cylinder passage.

According to another example of the present disclosure, a pipe bracket for a distributor valve in a railway vehicle brake control system is provided. The pipe bracket is connected to a brake pipe, a brake cylinder, and a reservoir of the brake control system, and wherein the pipe bracket is configured to have a main portion and a main line portion of the distributor valve mounted thereon. The pipe bracket includes: a plurality of passages defined in the pipe bracket and extending through the pipe bracket, the plurality of passages being configured to place the main portion and the main line portion of the distributor valve in communication with each other and with the brake pipe, the brake cylinder, and the reservoir, wherein the plurality of passages includes a working chamber passage configured to place the main portion in communication with the main line portion, a valve chamber passage configured to place the main portion in communication with the main line portion, a brake pipe passage configured to place the main portion and the main line portion in communication with the brake pipe, a reservoir passage configured to place the main portion in communication with the reservoir, a brake cylinder passage configured to place the main portion and the main line portion in communication with the brake cylinder, and at least one additional passage configured to place the main portion and the main line portion in communication with each other; and an integral port interface disposed on a side of the pipe bracket, the integral port interface including a plurality of access ports arranged therein. The plurality of access ports includes an access port connected to the working chamber passage, an access port connected to the valve chamber passage, an access port connected to the brake pipe passage, an access port connected to the reservoir passage, and an access port connected to the brake cylinder passage.

According to another example of the present disclosure, a pressure access plate configured to provide access to operational pressures in a distributor valve of a railway brake control system is provided. The distributor valve includes a pipe bracket, a main portion mounted on the pipe bracket, and a main line portion mounted on the pipe bracket. The distributor valve is connected to a brake pipe, a brake cylinder, and a reservoir of the brake control system. The pressure access plate is configured to be mounted between the pipe bracket and the main portion of the distributor valve. The pressure access plate includes a face having a plurality of access ports arranged therein; and a body having a plurality of internally segregated chambers defined therein, each of the internally segregated chambers being in communication with a corresponding access port in the face, each of the chambers including at least one opening configured to place the chamber in communication with a corresponding passage of the main portion and at least one opening configured to place the chamber in communication with a corresponding passage of the pipe bracket. The plurality of internally segregated chambers includes a first chamber configured to communicate a working chamber passage in the pipe bracket with a working chamber access port in the face and a first passage in the main portion, a second chamber configured to communicate a valve chamber passage in the pipe bracket with a valve chamber access port in the face and a second passage in the main portion, a third chamber configured to communicate a brake pipe passage in the pipe bracket with a brake pipe access port in the face and a third passage in the main portion, a fourth chamber configured to communicate a reservoir passage in the pipe bracket with a reservoir access port in the face and a fourth passage in the main portion, and a fifth chamber configured to communicate a brake cylinder passage in the pipe bracket with a brake cylinder access port in the face and a fifth passage in the main portion.

According to another example of the present disclosure, a method for accessing operational pressures in a distributor valve of a railway brake control system is provided. The distributor valve is connected to a brake pipe, a brake cylinder, and a reservoir of the brake control system. The distributor valve includes a pipe bracket, a main portion mounted on the pipe bracket, and a main line portion mounted on the pipe bracket. The pipe bracket includes a plurality of passages defined therein and extending through the pipe bracket, the plurality of passages being configured to place the main portion and the main line portion in communication with each other and with the brake pipe, the brake cylinder, and the reservoir. The plurality of passages includes a working chamber passage configured to place the main portion in communication with the main line portion, a valve chamber passage configured to place the main portion in communication with the main line portion, a brake pipe passage configured to place the main portion and the main line portion in communication with the brake pipe, a reservoir passage configured to place the main portion in communication with the reservoir, a brake cylinder passage configured to place the main portion and the main line portion in communication with the brake cylinder, and at least one additional passage configured to place the main portion and the main line portion in communication with each other. The method includes: providing an access interface including a plurality of access ports on the pipe bracket, the plurality of access ports including an access port connected to the working chamber passage, an access port connected to the valve chamber passage, an access port connected to the brake pipe passage, an access port connected to the reservoir passage, and an access port connected to the brake cylinder passage.

These and other features and characteristics of the present invention, as well as the methods of operation and functions of the related elements of structures, and the combination of parts and economies of manufacture will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
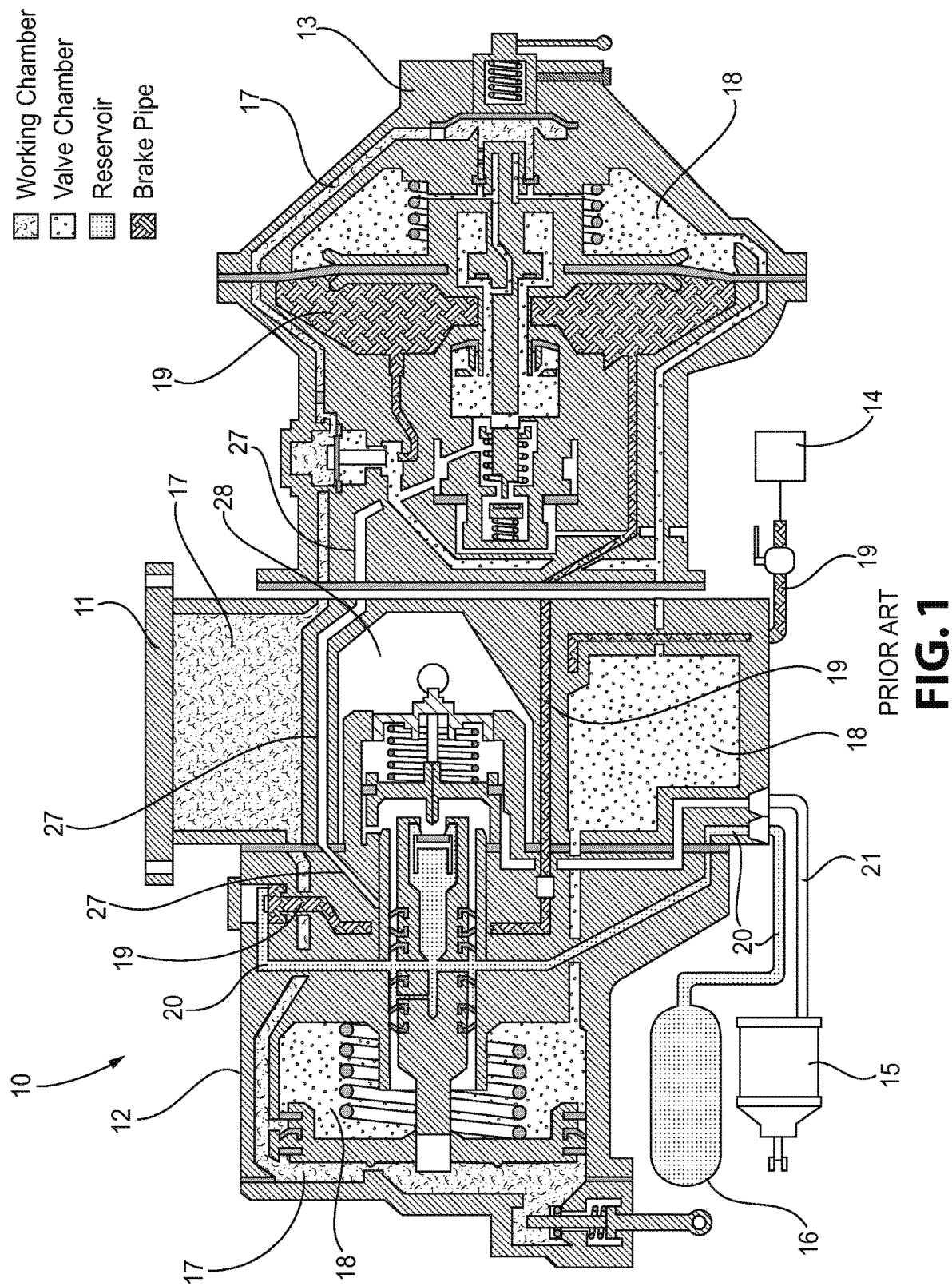
FIG. 1 depicts a diagrammatic view of a current Russian Model 483A-03 distributor valve.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

Current Russian Distributor Valve

Figure 2:
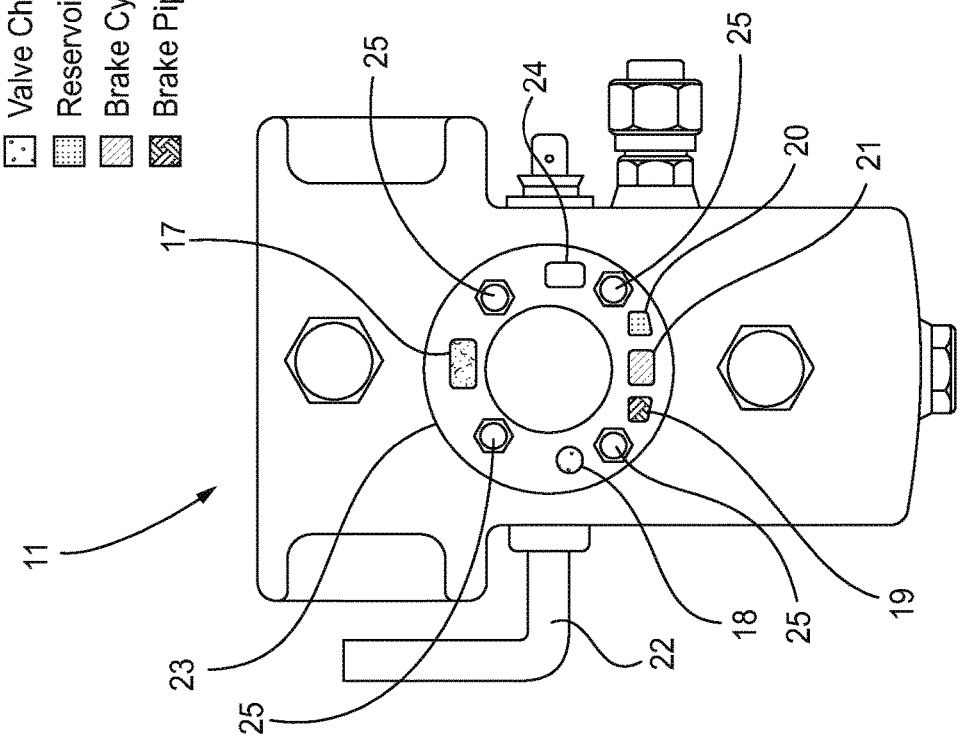
FIG. 2 depicts two side views of a current Russian pipe bracket (295M.001 or 295M.002) of the Russian distributor valve.
Figure 2:
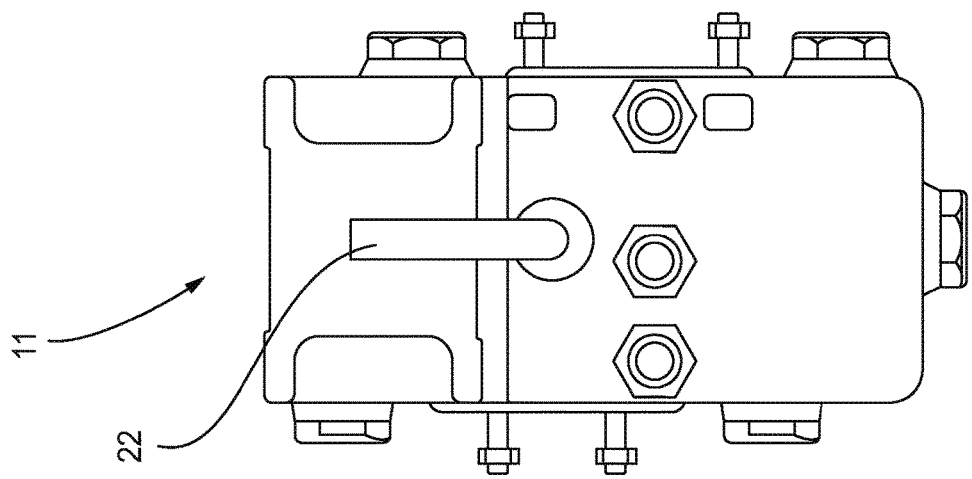

With reference to FIGS. 1 and 2, a current Russian 483A-03 distributor valve 10 is shown. The distributor valve 10 includes a pipe bracket (or chamber) 11, a main portion 12, and a main line portion 13. The distributor valve 10 is connected to a brake pipe 14, a brake cylinder 15, and a reservoir 16 of the brake control system and is fluid communication with the brake pipe 14, brake cylinder 15, and the reservoir 16 to control the flow of pressurized air to and from these components to control operations of the brake system. The pipe bracket 11 is the central portion to which the main and main line portions 12, 13 are mounted to create the distributor valve 10. The pipe bracket 11, the main portion 12, and the main line portion 13 include a plurality of passages and chambers, which are hereinafter collectively referred to as "passages" to develop the five different operating pressures required for operation of the distributor valve 10 to ensure proper pneumatic braking of a railway freight car. In particular, the distributor valve 10 includes working chamber passages 17 for the working chamber pressure, valve chamber passages 18 for the valve chamber pressure, brake pipe passages 19 for the brake pipe pressure, reservoir passages 20 for the reservoir pressure, and brake cylinder passages 21 for the brake cylinder pressure. The Additional Discharge Channel (ADC) passage 27 is a common integral passage between the main line portion 13, the pipe bracket 11, and the main portion 12 that supplies a small amount of combined brake pipe and valve chamber pressures direct to the brake cylinder passage 21 and a brake cylinder exhaust passage 28 on initial brake applications. As shown in FIG. 1, the passages 17, 18, 19, 20 include different symbols to illustrate the operating pressure developed therein. These same symbols are used to identify the same pressures throughout the drawings. The passages 21 and 27 for developing the brake cylinder pressure are blank because the distributor valve 10 is shown in its release position, in which the brake cylinder operational pressure is not developed.

As shown in FIG. 2, the pipe bracket 11 also includes a freight mode switch 22 that can be manually positioned based on the total gross rail weight of the freight car. This eccentric switch is in contact with specific internal parts of the main portion 12. The position of the freight mode switch (empty, medium, or loaded) will dictate how much brake cylinder pressure will be achieved on that particular freight car during a full service brake application. Before 'empty load' equipment was used on Russian freight cars, having the ability to manually manipulate how much brake cylinder pressure could be obtained during a service brake application was important to ensure proper train handling.

It should be noted that the distributor valve 10 lacks that ability to produce an emergency brake application, (i.e., the distributor valve 10 cannot locally vent brake pipe air pressure at a rapid rate at each distributor valve location on every freight car in the freight train). Therefore, during an 'emergency' brake application, all of the brake pipe air in the train's entire brake pipe line has to be exhausted out of the locomotive's brake valve handle, and is NOT rapidly locally vented at each distributor valve's location on each freight car. This arrangement leads to relatively longer times required to stop the train during an emergency brake application as compared to freight brake control systems commonly used in the United States. With respect to the Russian distributor valve 10, there is no increase in final brake cylinder pressure obtained between a full service or emergency brake application.

Brake pipe pressure is supplied to each individual Russian freight car in the entire train through an actual hard pipe from the train's locomotive. The compressors on the locomotive charge the main reservoir, from which the brake pipe line through the entire length of the train is charged. Therefore, brake pipe air is supplied to the brake pipe hard pipe from the locomotive through the locomotive's brake valve that is controlled by the train's engineer. Brake pipe air then flows down the length of the brake pipe on each freight car to pneumatically charge each freight car's distributor valve unit.

Within the Russian distributor valve main portion, brake pipe pressure charges the reservoir. Within the main line portion, brake pipe pressure charges the valve chamber which then charges the working chamber pressure. The Russian distributor valve pipe bracket internally houses two key reference pressures, working chamber and valve chamber. The pressure differential relationship between these two reference pressures dictate how the Russian distributor valve operates.

The Russian main portion is responsible for providing the following different types of pneumatic functions: Charges the Single Reservoir—allows the brake pipe to charge the single reservoir; Applies Brakes—when the working chamber/valve chamber pressure differential reaches a specific range when brake pipe air is being exhausted at the locomotive brake valve handle, reservoir pressure is dumped into the brake cylinder which moves the brake shoes against the wheels at each car to provide the retardation force locally at each car; Releases Brakes—when the working chamber/valve chamber pressure differential reaches a specific range, brake cylinder pressure is then vented directly to the atmosphere, thus releasing the braking force on each freight car; Limiting Valve Function—provides a specific range of brake cylinder pressure when brake pipe pressure is reduced at its minimum value from its original fully charged system pressure; Direct Action (a.k.a. brake cylinder pressure maintaining)—if a leak is present in the brake cylinder volume/piping on the freight car, reservoir air pressure will maintain the brake cylinder pressure at its previous established level; and Release Valve Function—allows for the ability to manually exhaust working chamber pressure which then allows for the proper release of brake cylinder pressure when the handle is manually manipulated.

The Russian pipe bracket (chamber) freight mode switch handle position (empty, medium, loaded) dictates how much final brake cylinder pressure will be obtained during a service brake application. Lower final brake cylinder pressures will be obtained with the freight mode switch in the 'empty' position. Maximum stopping force will be obtained with the freight mode switch in its 'loaded' position.

The Russian main line portion is responsible for providing the following different types of pneumatic functions: Charging Valve Chamber and Working Chamber—allows brake pipe pressure to charge the valve chamber which then charges working chamber pressure; Additional Discharge of Brake Pipe Pressure—provides a local reduction of brake pipe pressure that helps propagate the braking signal faster through the train, which involves locally venting brake pipe pressure at a slow rate on each distributor valve unit in the train and results in shorter train stop distances; Direct Release of Brake Cylinder Pressure—when this portion's handle is in 'plain' mode (flat terrain mode) and the brakes are released on the freight car after a brake application, brake cylinder pressure fully exhausts down to 0 PSI (i.e., direct release of brakes occurs); Graduated Release of Brake Cylinder Pressure—when this portion's handle is in 'hilly' mode (mountainous terrain), the amount of brake cylinder pressure exhausted on each freight car is limited (i.e., graduated release of BC pressure occurs) with the amount of brake cylinder pressure being released being solely dependent upon how much brake pipe pressure air is increased by the engineer at the locomotive's brake valve handle; and Over-Charge Dissipation—allows the 'overcharge' of brake pipe pressure to flow back into the valve chamber at a specific rate so that the distributor valve does NOT apply the brakes. In Russia, over-charging the brake pipe line with greater than required system brake pipe pressure is performed to help ensure that the brakes in the rear of the train do indeed 'release'. The 'overcharging' of brake pipe pressure is required because the current Russian distributor valve does NOT have a service accelerated release function or an emergency accelerated release function.

As stated earlier, the current Russian distributor valve does NOT have an 'emergency' portion. Therefore, in Russia, when an 'emergency' application is made, the final brake cylinder pressure developed is the same regardless of whether brake pipe pressure was reduced to 0 PSI at a 'service' rate of reduction, or very rapidly, at an 'emergency' rate of reduction at the locomotive brake valve handle.

As of today, current Russian standards only state that a manual single car test must be performed on a Russian freight car ONLY when a new OEM Russian distributor valve is mounted to a Russian freight car or when the complete Russian distributor valve unit is replaced with a complete re-conditioned distributor valve unit. The current Russian single car test procedure utilizes a manually controlled single car test device that only accesses brake pipe pressure and manually monitors both brake pipe and brake cylinder pressures with analog gauges to check for proper operation of the Russian distributor valve unit. Using an automated single car test device that can manipulate all five required pneumatic pressures available in the Russian freight braking system (brake pipe, working chamber, valve chamber, reservoir, brake cylinder) will result in a more efficient and significantly better single car test method for the Russian freight car. Furthermore, an automated Russian single car test device will allow Russian freight cars to be tested while still in 'field service'. A Russian Automated Single Car Test Device (RASCTD) can potentially lead to a paradigm shift on how often a Russian freight car receives a single car test to ensure proper functionality of the pneumatic Russian braking system exists which, therefore, will lead to an overall safer operating Russian freight fleet.

With reference to FIGS. 1 and 2, the pipe bracket 11 of the Russian distributor valve 10 includes an interface 23 for mounting the main portion 12 to the pipe bracket 11 and for establishing a pneumatic interface between the passages of the pipe bracket 11 and the main portion 12. As shown, the interface 23 includes openings or ports for establishing pneumatic connections between the working chamber passages 17, the valve chamber passages 18, the brake pipe passages 19, the reservoir passages 20, the brake cylinder passages 21, and the ADC passage 27 in the pipe bracket 11 and the corresponding passages 17, 18, 19, 20, 21, 27 in the main portion 12. The interface 23 also includes an ADC port 24 for transmitting pressure and/or pneumatic signals between the ADC passages of the pipe bracket 11, the main portion 12, and the main line portion 13 that do not need to be measured or tested as part of the single car diagnostic testing of the distributor valve 10. The interface 23 also includes a plurality of mounting holes 25 that receive fasteners connecting the main portion 12 to the pipe bracket 11.

The interfaces for all current Russian distributor valve pipe brackets contain air passageways located in the same specific area on each type of pipe bracket. This is specifically done for interchangeability of the Russian main portion. The main portion side of the pipe bracket contains access to all five working pressures (working chamber, valve chamber, brake pipe, brake cylinder, and reservoir) that would be required to be monitored in order to perform an automated version of the Russian single car test. The main line portion side of the Russian distributor valve does NOT contain access to all five of these required working pressures.

Pressure Access Plate

Figure 3:
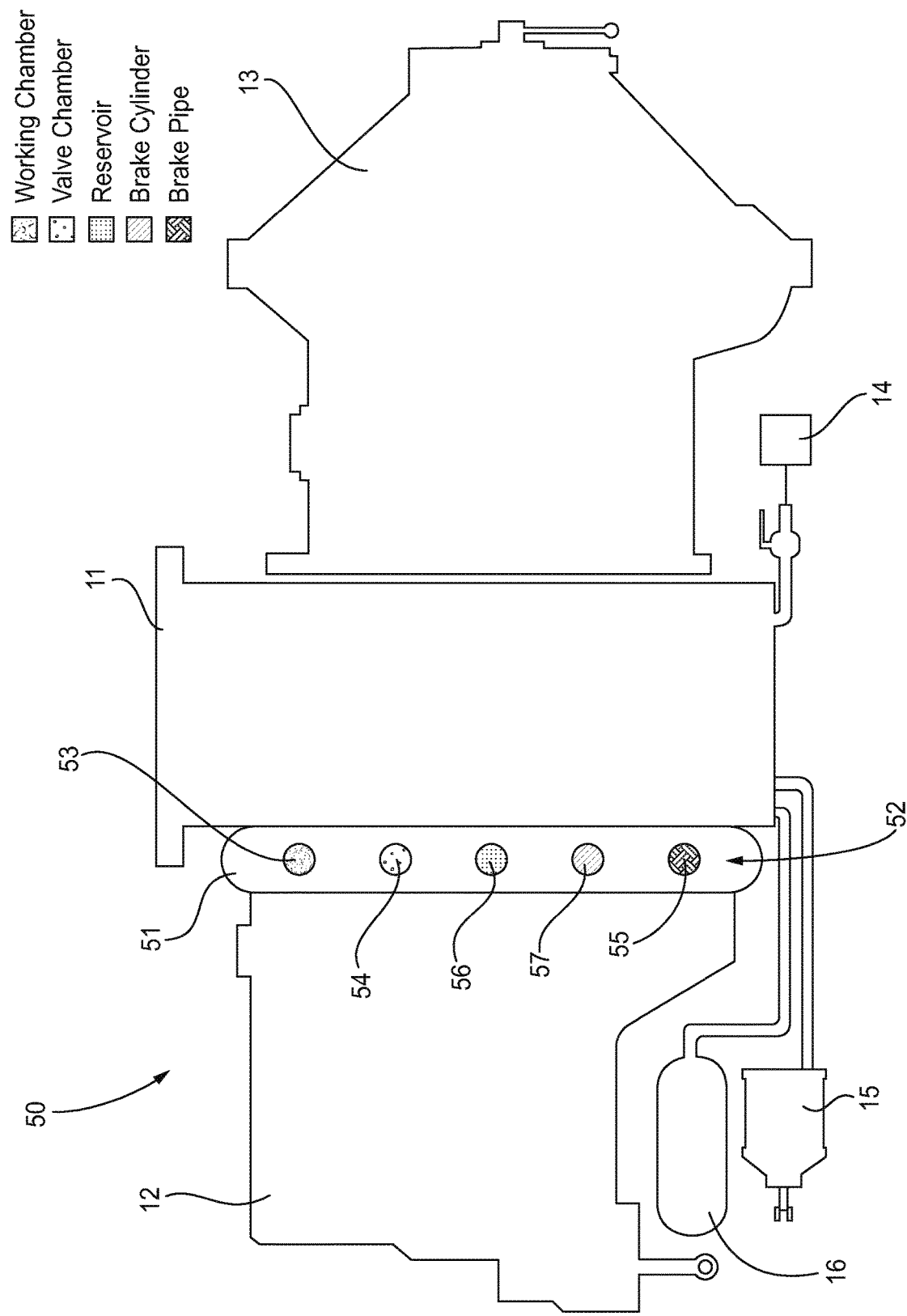
FIG. 3 depicts a distributor valve incorporating a pressure access plate in accordance with an aspect or example of the present disclosure.
Figure 4:
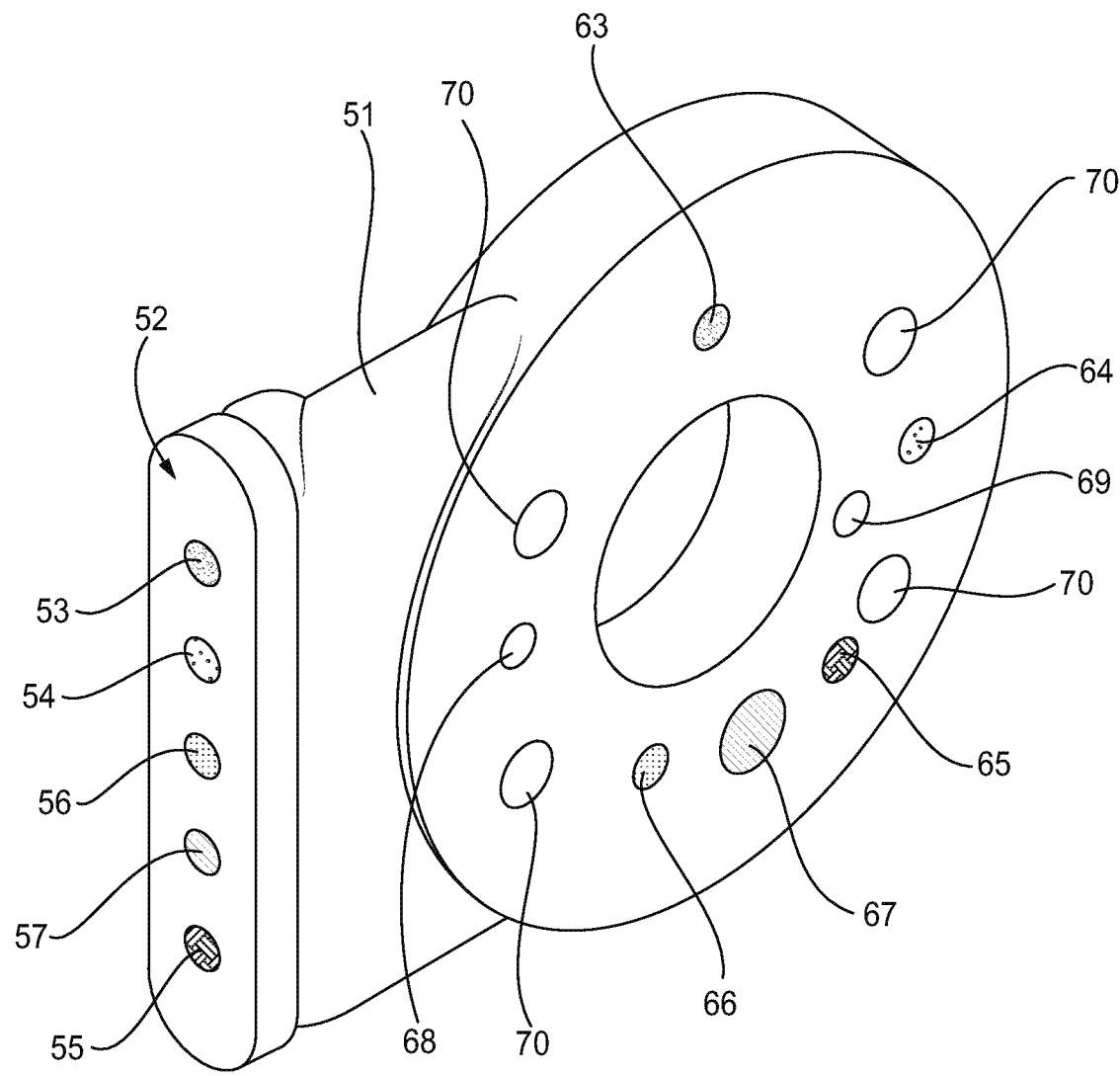
FIG. 4 depicts a perspective view of the pressure access plate of FIG. 3.
Figure 5:
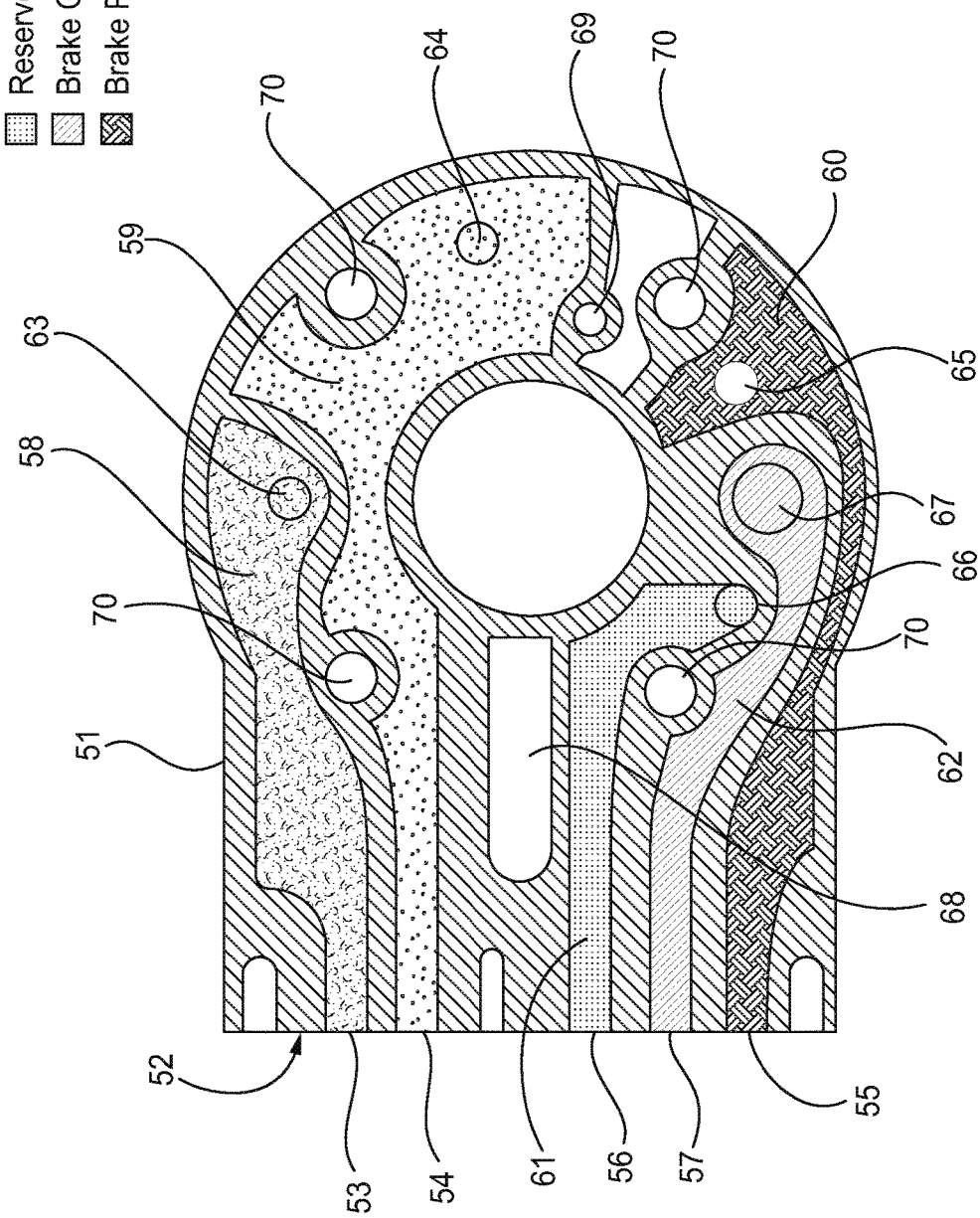
FIG. 5 depicts a cross-sectional view of the pressure access plate of FIG. 3.

With reference to FIGS. 3-5, a Russian distributor valve 50 incorporating an access interface in the form of a pressure access plate 51 is shown in accordance with one example of the present disclosure. The distributor valve 50 is of the same configuration and construction as the distributor valve 10 discussed above with reference to FIGS. 1 and 2. As shown, the distributor valve 50 is connected to a brake pipe 14, brake cylinder 15, and reservoir 16 of the brake control system. The distributor valve 50 includes the pipe bracket 11, the main portion 12 mounted on the pipe bracket 11, and the main line portion 13 mounted on an opposite side of the pipe bracket 11 from the main portion 12. As discussed above, the pipe bracket 11 includes a plurality of passages 17, 18, 19, 20, 21, 27 (shown in FIG. 1) defined therein and extending through the pipe bracket 11. The plurality of passages 17, 18, 19, 20, 21, 27 are configured to place the main portion 12 and the main line portion 13 in communication with each other and with the brake pipe 14, the brake cylinder 15, and the reservoir 16, as shown in FIG. 1. In particular, the plurality of passages includes a working chamber passage 17 configured to place the main portion 12 in communication with the main line portion 13, a valve chamber passage 18 configured to place the main portion 12 in communication with the main line portion 13, a brake pipe passage 19 configured to place the main portion 12 and the main line portion 13 in communication with the brake pipe 14, a reservoir passage 20 configured to place the main portion 12 in communication with the reservoir 16, a brake cylinder passage 21 configured to place the main portion 12 and the main line portion 13 in communication with the brake cylinder 15, and the ADC passage 27 configured to place the main portion 12 in communication with the main line portion 13 through the pipe bracket 11.

As shown, the pipe bracket 11 of the distributor valve 50 also includes an access interface in the form of the pressure access plate 51. The pressure access plate 51 is mounted between the main portion 12 and the pipe bracket 11 of the distributor valve 50 and is configured to provide access to the five operational pressures of the railway brake control system (working chamber, valve chamber, brake pipe, reservoir, and brake cylinder). The pressure access plate 51 includes a face 52 having a plurality of access ports 53, 54, 55, 56, 57 arranged therein and a body having a plurality of internally segregated chambers 58, 59, 60, 61, 62 defined therein. Each of the internally segregated chambers 58, 59, 60, 61, 62 is in communication with a corresponding one of the access ports 53, 54, 55, 56, 57 in the face 52. Each of the chambers 58, 59, 60, 61, 62 also includes at least one opening 63, 64, 65, 66, 67 configured to place the chamber 58, 59, 60, 61, 62 in communication with a corresponding passage 17, 18, 19, 20, 21 of the pipe bracket 11 and the main portion 12. In particular, each chamber 58, 59, 60, 61, 62 includes openings 63, 64, 65, 66, 67 defined in each opposing side of the pressure access plate 51 and intersecting with the chambers 58, 59, 60, 61, 62 that interface with the corresponding passages 17, 18, 19, 20, 21 of the pipe bracket 11 and the main portion 12. Annular gaskets (not shown) may be provided around each of the openings 63, 64, 65, 66, 67 in the pressure access plate 51. Alternatively, a unitary gasket (not shown) may be provided around several adjacent openings or around all of the openings on both sides of the pressure access plate 51.

The face 52 of the pressure access plate 51 includes an access port 53 connected to the working chamber 17, an access port 54 connected to the valve chamber 18, an access port 55 connected to the brake pipe passages 19, an access port 56 connected to the reservoir passages 20, and an access port 57 connected to the brake cylinder passages 21. The plurality of internally segregated chambers formed in the pressure access plate 52 include a first chamber 58 configured to communicate with the working chamber 17 in the pipe bracket 11 with the working chamber access port 53 in the face 52 and the working chamber passages 17 in the main portion 12 via openings 63, a second chamber 59 configured to communicate the valve chamber 18 in the pipe bracket 11 with the valve chamber access port 54 in the face 52 and the valve chamber passages 18 in the main portion 12 via openings 64, a third chamber 60 configured to communicate the brake pipe passages 19 in the pipe bracket 11 with the brake pipe access port 55 in the face 52 and the brake pipe passages 19 in the main portion 12 via openings 65, a fourth chamber 61 configured to communicate the reservoir passages 20 in the pipe bracket 11 with the reservoir access port 56 in the face 52 and the reservoir passages 20 in the main portion 12 via openings 66, and a fifth chamber 62 configured to communicate the brake cylinder passages 21 in the pipe bracket 11 with the brake cylinder access port 57 in the face 52 and the brake cylinder passages 21 in the main portion 12 via openings 67.

As shown in FIGS. 4 and 5, the pressure access plate 51 also includes ADC opening 68 and a brake pipe signal opening 69 extending through the body of the pressure access plate 51 without communicating with any of the segregated chambers 58, 59, 60, 61, 62 in order to communicate corresponding pressures in the pipe bracket 11 and the main portion 12 of the distributor valve 50 through the pressure access plate 51. In particular, the ADC passage 27 in the pipe bracket 11 is connected to the corresponding passage in the main portion 12 through the ADC opening 68 in the pressure access plate 51. The ADC opening 68 is not required to be accessible through the face 52 of the pressure access plate 51. The ADC opening 68 and the brake pipe signal opening 69 may also be surrounded with annular gaskets (not shown) to provide a seal between these openings 68, 69 and the corresponding passages in the pipe bracket 11 and the main portion 12. The pressure access plate 51 further includes a plurality of mounting holes 70 extending through the pressure access plate 51 without communicating between any of the segregated chambers 58, 59, 60, 61, 62, to allow mounting studs (not shown) to pass through the plurality of mounting holes 70 so that the pressure access plate 51 can be securely fastened between the pipe bracket 11 and the main portion 12 when mounting stud nuts (not shown) are tightened.

As shown in FIG. 4, the face 52 of the pressure access plate 51 is connected to the body by an angled portion of the body. This angled portion allows the face 52 to be positioned at a selected amount away from the pipe bracket 11 or the main portion 12 when the access plate 51 is mounted between the main portion 12 and the pipe bracket 11.

Although not shown, it is to be appreciated that the pressure access plate 51 may be configured to face in any direction with respect to the main portion 12 and the pipe bracket 11. For instance, the pressure access plate 51 could be configured such that the face 52 is disposed upwardly, downwardly, or rearwardly from the orientation shown in FIG. 3. Further, it is to be appreciated that the pressure access plate 51 may be formed with multiple faces of access ports that are oriented in different directions to facilitate access of the operational pressures of the distributor valve 50 via the pressure access plate 51. It is also to be appreciated that the pressure access plate 51 may be formed from any material and according to any technique known to be suitable to those having ordinary skill in the art. In particular, the pressure access plate 51 may be formed as an iron casting with the chambers 58, 59, 60, 61, 62 integrally formed in the casting according to known techniques. Alternatively, the pressure access plate 51 may be formed from a different metal, such as steel or aluminum, or from a plastic material. Also, the arrangement of the ports 53, 54, 55, 56, 57 in the face 52 of pressure access plate 51 may be adjusted in a manner that is best suited for the overall design of the casting. Thus, the positions of the ports 53, 54, 55, 56, 57 on the face 52 may be different than illustrated. It is further to be appreciated that the pressure access plate 51 may be structured to be positioned between the main portion 12 and the pipe bracket 11 in Russian distributor valves 10 that are configured to mount the main portion 12 and the main line portion 13 side by side next to each other on one side of the pipe bracket 11.

Figure 11:
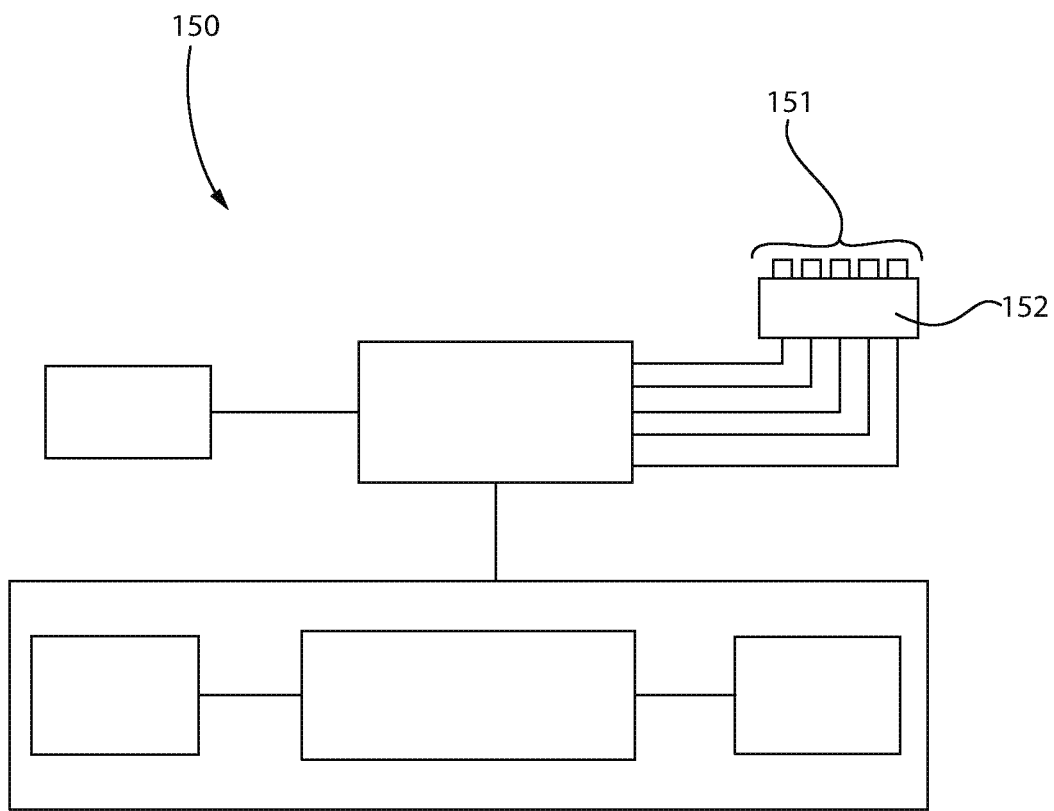
FIG. 11 depicts a schematic view of a testing device for use with the pressure access plate or the integral port interface in accordance with an example of the present disclosure.

With reference to FIG. 11, the face 52 of the pressure access plate 51 is configured to be engaged by a testing device 150 that measures the operational pressures of the plurality of passages 17, 18, 19, 20, 21 of the pipe bracket 11 via the access ports 53, 54, 55, 56, 57 defined in the face 52 of the pressure access plate. As discussed above, the testing device 150 may be an automated single car test device that can manipulate all five required pneumatic pressures available in the Russian freight braking system. The testing device 150 includes a fitting 151 and an adapter 152 configured to engage the face 52 of the pressure access plate 51 to place the access ports 53, 54, 55, 56, 57 in pneumatic communication with the sensing apparatus of the testing device 150. The face 52 may include mounting holes 118 defined therein for establishing a connection between the fitting 151 and the face 52. A testing device of this type adapted for testing pressures in an American freight braking system is described in U.S. Pat. Nos. 5,451,099 and 5,480,218. When the operational pressures of the distributor valve 50 are not being tested, a cover plate (not shown) or similar closure may be connected to the face 52 of the pressure access plate 51 to seal the access ports 53, 54, 55, 56, 57 closed.

Pipe Bracket with Access Interface

Figure 6:
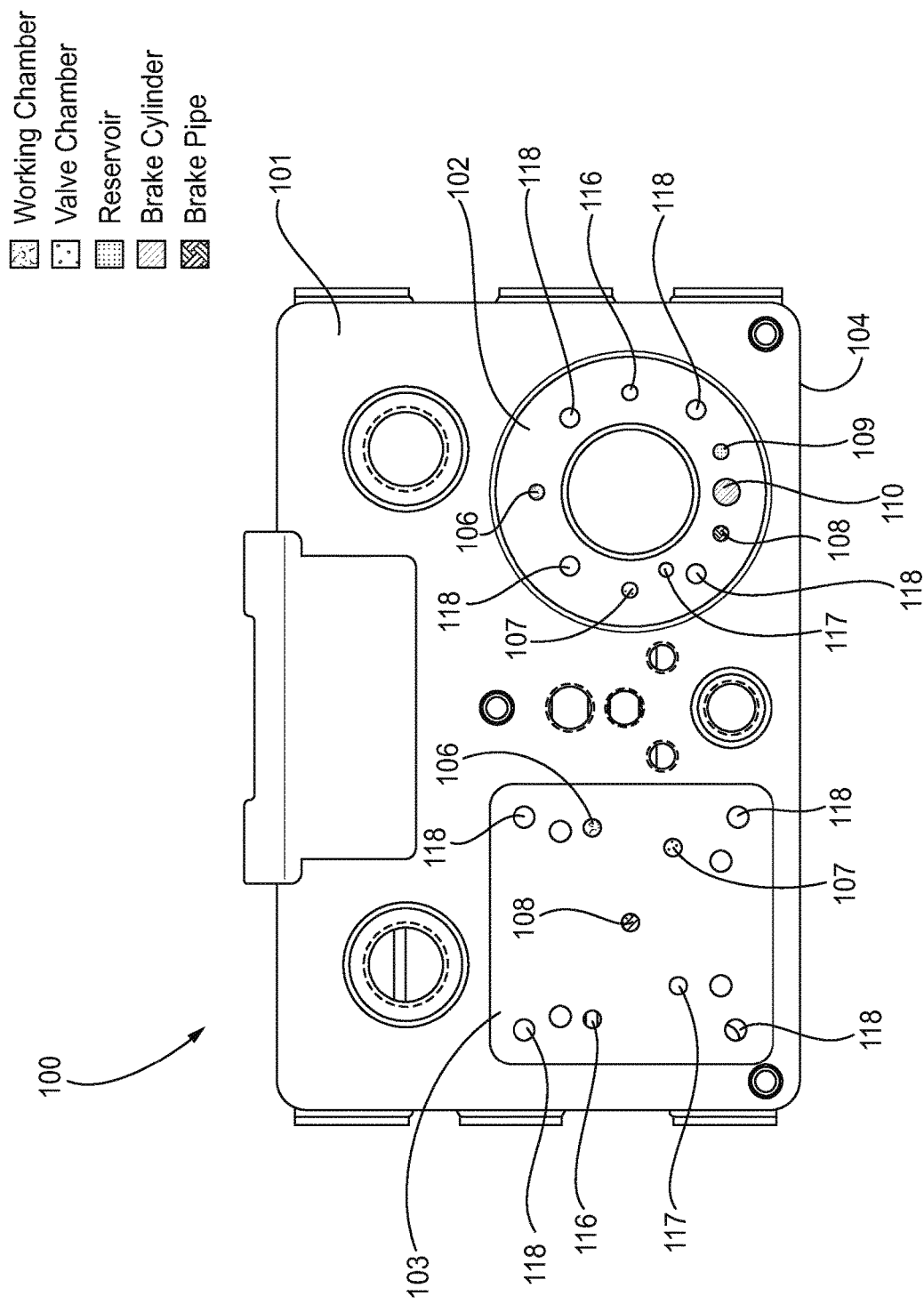
FIG. 6 depicts a front view of a distributor valve pipe bracket having an integral port interface in accordance with an example of the present disclosure.

With reference to FIGS. 6-10, a pipe bracket 100 for a distributor valve in a railway vehicle brake control system incorporating an access interface in the form of an integral port interface 105 is shown in accordance with an example of the present disclosure. The pipe bracket 100 is configured for the Russian freight market that will work with the current types of Russian 'main' and 'main-line' portions. The pipe bracket 100 is intended as a replacement for the above-discussed pipe bracket 11 of typical Russian railway brake control systems. As shown in FIG. 6, the pipe bracket 100 is formed as a multi-sided construction having a first or front side 101 and a second or bottom side 104 adjacent to the first or front side 101.

Figure 7:
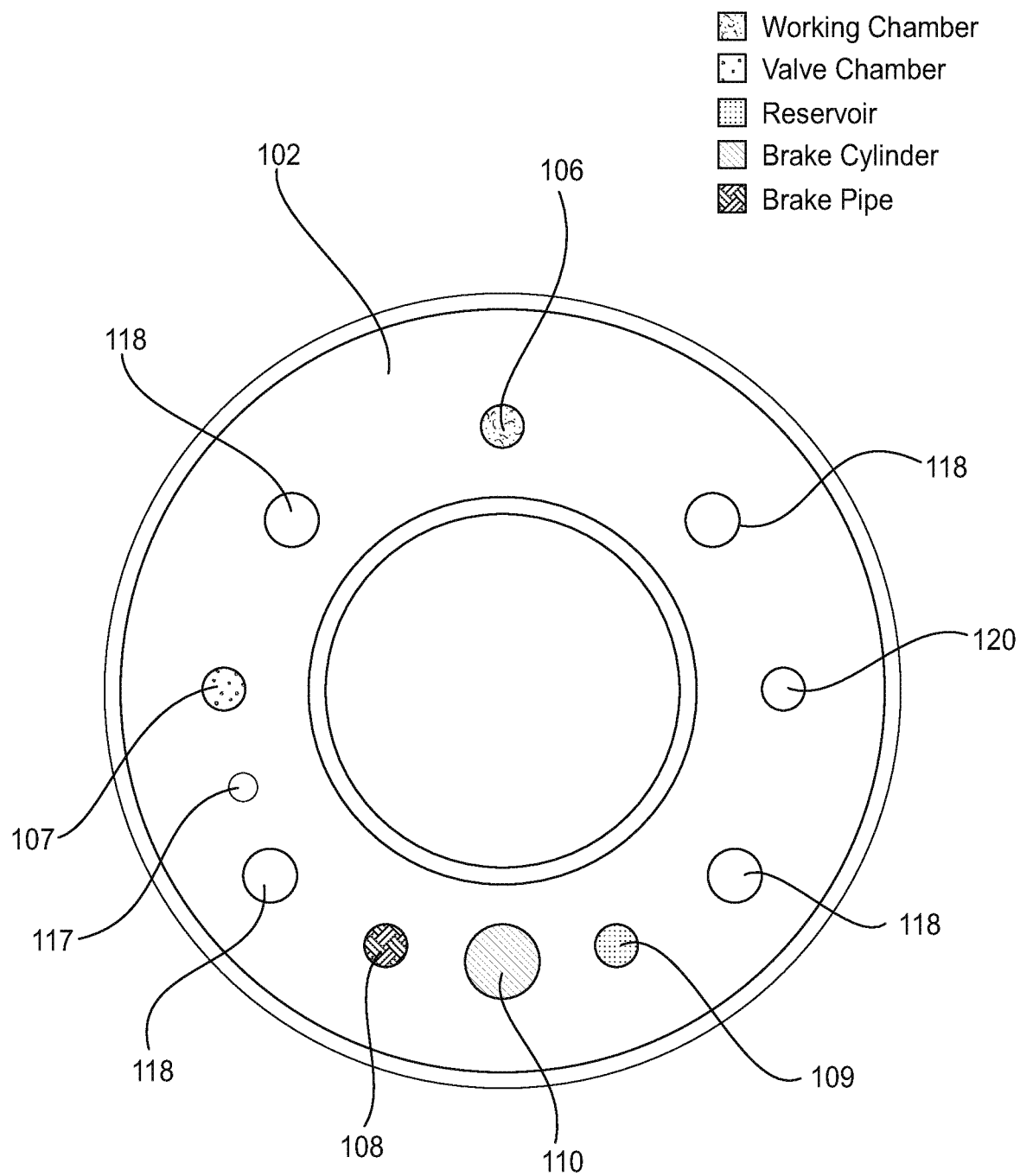
FIG. 7 depicts an enlarged view of an interface on the distributor valve pipe bracket of FIG. 6 for mounting of the main portion of the distributor valve on the pipe bracket in accordance with an example of the present disclosure.

As shown in FIGS. 6 and 7, the first side 101 includes an interface 102 for mounting the above-described main portion 12 of the distributor valve on the pipe bracket 100 and another interface 103 for mounting the above-described main line portion 13 of the distributor valve spaced apart on the first side 101 of the pipe bracket 100. Further, the pipe bracket 100 is configured to be connected to the brake pipe 14, the brake cylinder 15, and the reservoir 16 of the brake control system, as discussed above.

As shown in FIGS. 6-10, the pipe bracket 100 has a plurality of passages 106, 107, 108, 109, 110, 117, 120, 121 defined therein and extending through the pipe bracket 100. In FIGS. 6-10, the passages 106, 107, 108, 109, 110, 117, 120, 121 are identified by the openings or sectors of the pipe bracket 100 where the passages 106, 107, 108, 109, 110, 117, 120, 121 may be exposed to or in communication with the exterior of the pipe bracket 100. In particular, the pipe bracket 100 includes a working chamber passage or passages 106, a valve chamber passage or passages 107, a brake pipe passage or passages 108, a reservoir passage or passages 109, and a brake cylinder passage or passages 110. The passages 106, 107, 108, 109, 110 accommodate the same five operational pressures of the Russian distributor valve as the pipe bracket 11 discussed above. In FIGS. 6-10, the operational pressures are also designated with various types of shading or cross-hatching for clarity in understanding the drawings.

As shown in FIGS. 6 and 7, the interfaces 102, 103 on the first side 101 of the pipe bracket 100 include openings for communicating the passages 106, 107, 108, 109, 110, 117, 120 of the pipe bracket 100 in communication with corresponding passages of the main portion 12 and the main line portion 13. As such, the passages 106, 107, 108, 109, 110, 117, 120 place the main portion 12 and the main line portion 13 in communication with each other and with the brake pipe 14, the brake cylinder 15, and the reservoir 16.

As shown in FIG. 7, the interface 102 for mounting and communicating the main portion 12 on the pipe bracket 100 includes a port that accesses the working chamber passages 106 for communicating the working chamber pressure, a port that accesses the valve chamber passages 107 for communicating the valve chamber pressure, a port that accesses the brake pipe passages 108 for communicating the brake pipe pressure, a port that accesses the reservoir passages 109 for communicating the reservoir pressure, and a port that accesses the brake cylinder passages 110 for communicating the brake cylinder pressure. The interface 102 for the main portion 12 may additionally include an opening for the ADC passage 120 for communicating the ADC pressure in the ADC passage 120 between the pipe bracket 100 and the main portion 12. The interface 102 for the main portion 12 may also include an opening for the brake pipe signal passage 117 for communicating the brake pipe signal pressure in the brake pipe signal passage 117 between the pipe bracket 100 and the main portion 12.

The brake pipe signal passage 117 in the pipe bracket 100 provides another brake pipe port passage that, depending upon the handle position of the main line portion 13, will either allow brake pipe air to flow to the main portion 12 to ensure that service accelerated release (SAR) of the brakes can occur or will prevent brake pipe air to flow in a manner that will nullify the SAR function. Current Russian distributor valves are not configured to perform the SAR function. According to the example of the present disclosure, the pipe bracket 100, main portion 12, and main line portion 13 may be configured to perform the SAR function, which provides for improvements in handling and braking of the train. The pressure within the brake pipe signal passage 117 of the pipe bracket 100 and corresponding passages in the main portion 12 and the main line portion 13 does not need to be monitored during single car diagnostic testing of the distributor valve.

As shown in FIG. 6, the interface 103 for the main line portion 13 may include an opening for communicating the ADC pressure in the ADC passage 120 between the pipe bracket 100 and the main line portion 13. Both interfaces 102, 103 include mounting holes 118 for accepting fasteners mounting the main portion 12 and the main line portion 13 of the distributor valve 10 to the pipe bracket 100 at the interfaces 102, 103. According to one alternative example of the present disclosure, the pipe bracket 100 is provided without the brake pipe signal passage 117 and the corresponding opening in the interface 102.

Figure 9:
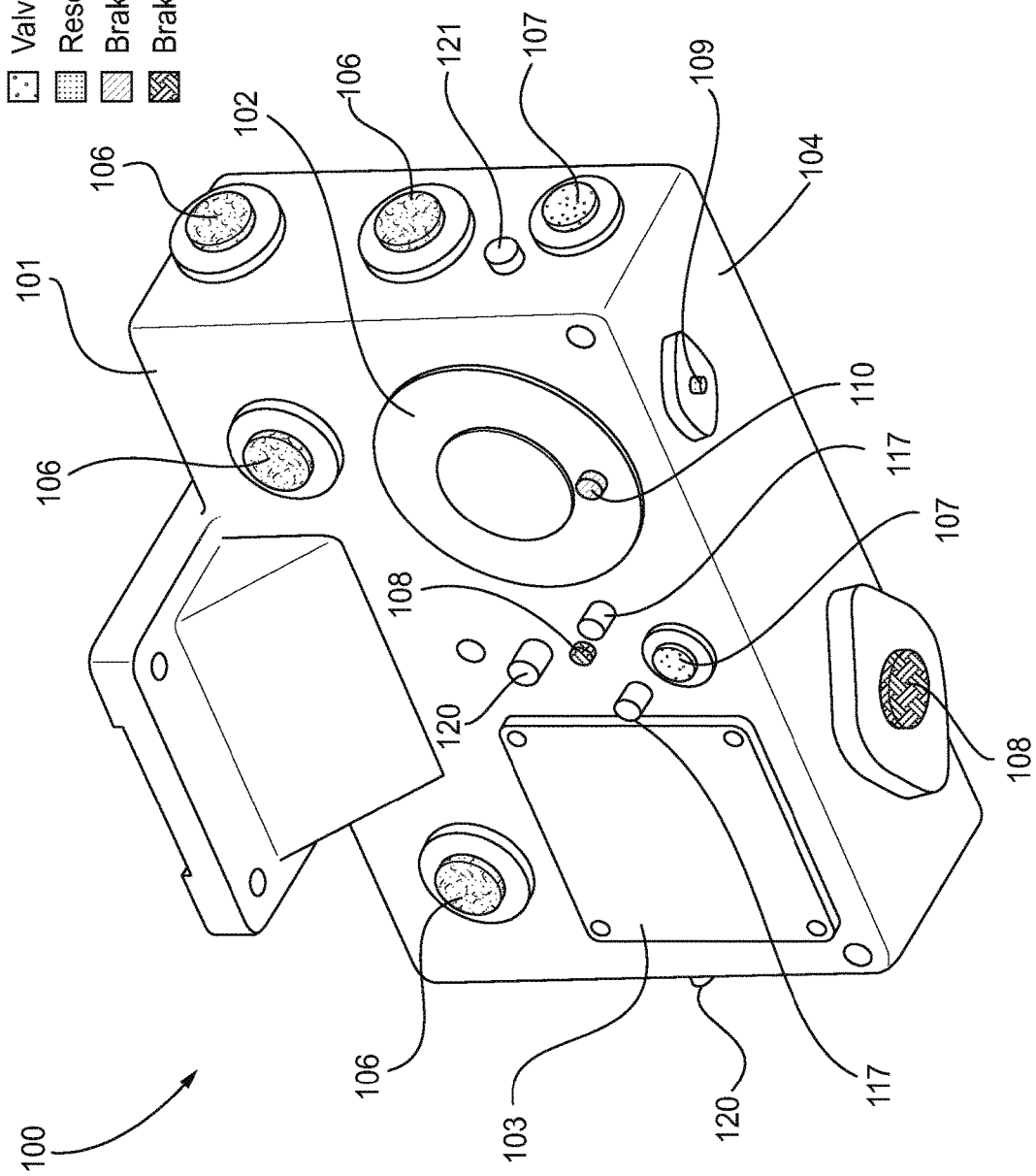
FIG. 9 depicts a perspective view of the distributor valve pipe bracket of FIG. 6 illustrating the passages.

As shown in FIG. 9, the working chamber passage 106, the valve chamber passage 107, the brake pipe signal passage 117, and the ADC passage 120 place the main portion 12 in communication with the main line portion 13. The brake cylinder exhaust passage 121 places the main portion 12 in communication with the pipe bracket 11. The brake pipe passage 108 places the main portion 12 and the main line portion 13 in communication with the brake pipe 14. The reservoir passage 109 places the main portion 12 in communication with the reservoir 16. The brake cylinder passage 110 places the main portion 12 and the main line portion 13 in communication with the brake cylinder 15.

Figure 8:
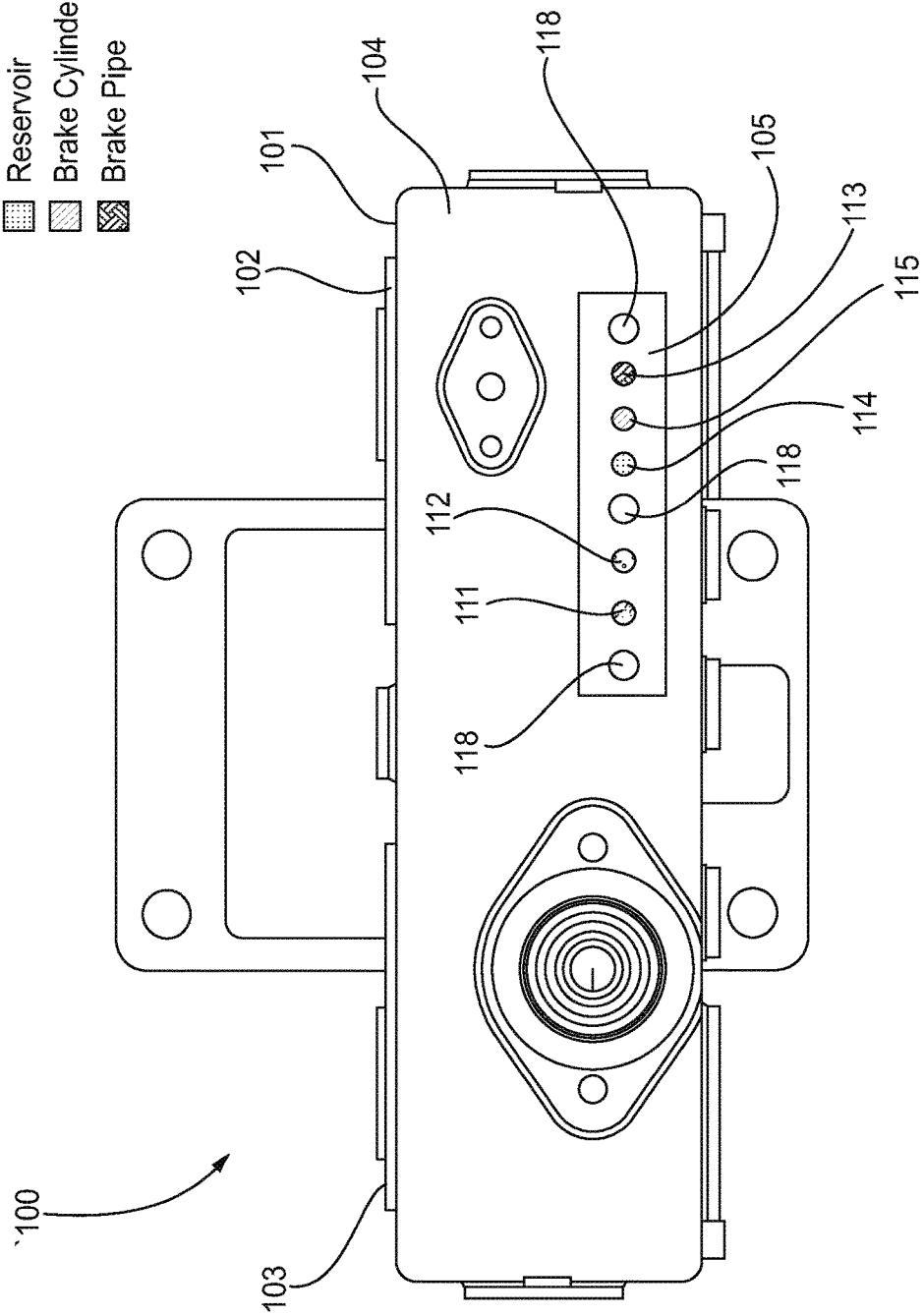
FIG. 8 depicts a bottom view of the distributor valve pipe bracket of FIG. 6.
Figure 10:
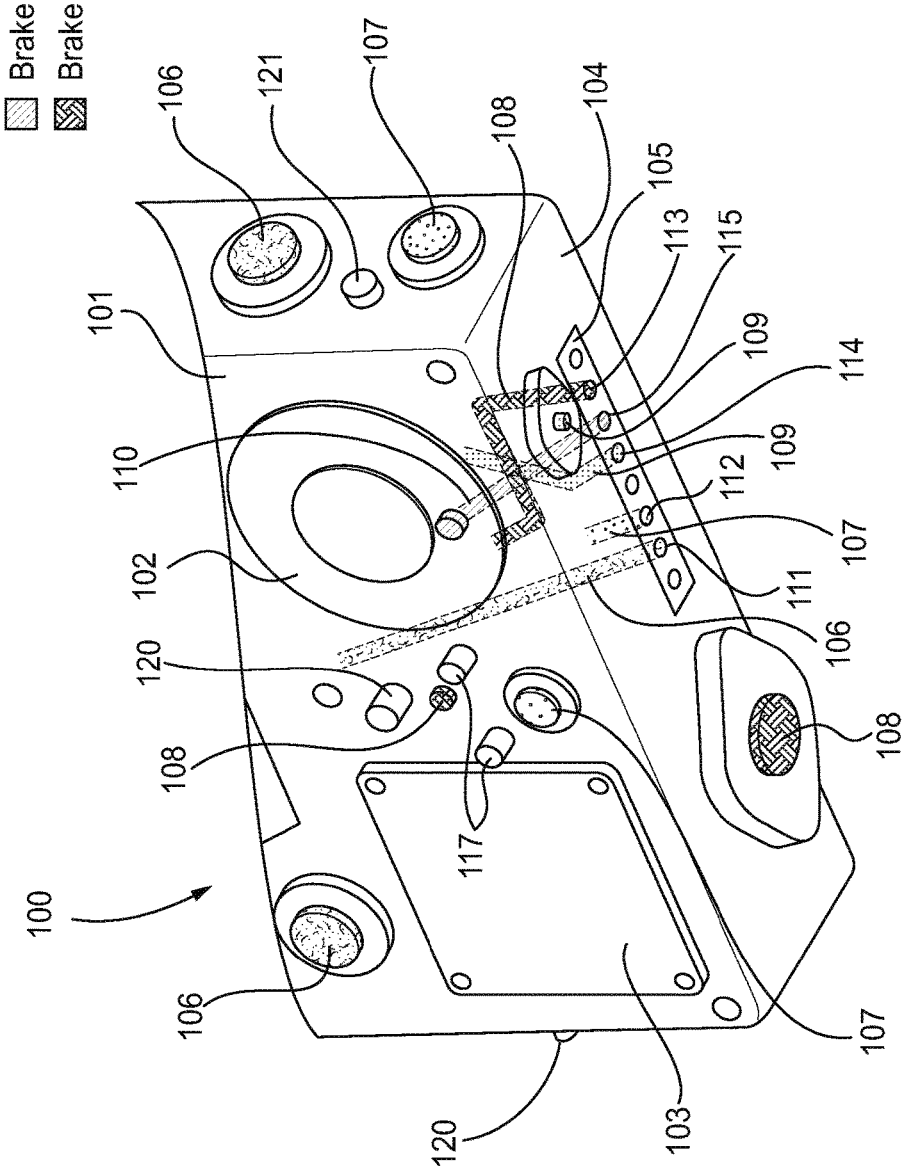
FIG. 10 depicts another perspective view of the distributor valve pipe bracket of FIG. 6 illustrating the communication between the integral port interface and the internal passages of the pipe bracket.

As shown in FIGS. 8 and 10, the pipe bracket 100 additionally includes the integral port interface 105 formed on the second or bottom side 104 of the pipe bracket 100 adjacent to the interface 102 for mounting the main portion 12 to the pipe bracket 100. It is to be appreciated that the positioning of the integral portion interface 105 may be changed to a different side or location of the pipe bracket 100. The integral port interface 105 includes a plurality of access ports 111, 112, 113, 114, 115 arranged therein. In particular, the integral port interface 105 includes an access port 111 connected to the working chamber passage 106, an access port 112 connected to the valve chamber passage 107, an access port 113 connected to the brake pipe passage 108, an access port 114 connected to the reservoir passage 109, and an access port 115 connected to the brake cylinder passage 110. FIG. 10 shows, according to one particular example of the present disclosure, that the pipe bracket 100 may include short tubes integrally formed or assembled therein for communicating the passages 106, 107, 108, 109, 110 of the pipe bracket 100 with the corresponding access ports 111, 112, 113, 114, 115. It is to be appreciated that the pipe bracket 100 may be constructed in any manner known to be suitable to those having ordinary skill in the art to provide the integral port interface 105 in communication with the passages 106, 107, 108, 109, 110 of the pipe bracket 100.

It is to be appreciated that the pipe bracket 100 may be formed from any material and according to any technique known to be suitable to those having ordinary skill in the art. In particular, the pipe bracket 100 may be formed from one or more metal, particularly iron, castings with the passages 106, 107, 108, 109, 110 integrally formed therein.

With reference to FIGS. 10 and 11, the integral access interface 105 of the pipe bracket 100 is configured to be engaged by a testing device 150 that measures the operational pressures of the plurality of passages 106, 107, 108, 109, 110 of the pipe bracket 100 via the access ports 111, 112, 113, 114, 115 of the integral access interface 105. As discussed above, the testing device 150 may be an automated single car test device that can manipulate all five required pneumatic pressures available in the Russian freight braking system. The testing device 150 includes a fitting 151 and an adapter 152 configured to engage the integral access interface 105 of the pipe bracket 100 to place the access ports 111, 112, 113, 114, 115 in pneumatic communication with the sensing apparatus of the testing device 150. The integral access interface 105 may include mounting holes 118 defined therein for establishing a connection between the fitting 151 and the side 104 of the pipe bracket 100. A testing device of this type adapted for testing pressures in an American freight braking system is described in U.S. Pat. Nos. 5,451,099 and 5,480,218. When the operational pressures of the distributor valve 10 are not being tested, a cover plate (not shown) or similar closure may be connected to the integral access interface 105 of the pipe bracket 100 to seal the access ports 111, 112, 113, 114, 115 closed.

Method

With reference to FIGS. 1-11, a method for accessing operation pressures in a distributor valve 10 of a railway brake control system is provided in accordance with a non-limiting embodiment or aspect of the present disclosure. The distributor valve 10 is connected to a brake pipe 14, a brake cylinder 15, and a reservoir 16 of the brake control system. The distributor valve 10 includes a pipe bracket 11, 100, a main portion 12 mounted on the pipe bracket 11, 100, and a main line portion 13 mounted on the pipe bracket 11, 100. The pipe bracket 11, 100 includes a plurality of passages 17, 18, 19, 20, 21, 27, 28, 106, 107, 108, 109, 110, 117, 120, 121 defined therein and extending through the pipe bracket 11, 100. The plurality of passages 17, 18, 19, 20, 21, 27, 28, 106, 107, 108, 109, 110, 117, 120, 121 are configured to place the main portion 12 and the main line portion 13 in communication with each other and with the brake pipe 14, the brake cylinder 15, and the reservoir 16. The plurality of passages 17, 18, 19, 20, 21, 27, 28, 106, 107, 108, 109, 110, 117, 120, 121 include a working chamber passage 17, 106 configured to place the main portion 12 in communication with the main line portion 13, a valve chamber passage 18, 107 configured to place the main portion 12 in communication with the main line portion 13, a brake pipe passage 19, 108 configured to place the main portion 12 and the main line portion 13 in communication with the brake pipe 14, a reservoir passage 20, 109 configured to place the main portion 12 in communication with the reservoir 16, a brake cylinder passage 21, 110 configured to place the main portion 12 and the main line portion 13 in communication with the brake cylinder 15, and an ADC passage 27, 120 configured to place the main portion 12 and the main line portion 13 in communication with each other. The pipe bracket 11, 100 may also have a brake pipe signal passage 117 configured to place the main portion 12 and the main line portion 13 in communication with each other.

The method includes providing an access interface 51, 105 comprising a plurality of access ports 53, 54, 55, 56, 57, 111, 112, 113, 114, 115 on the pipe bracket 11, 100. The plurality of access ports includes an access port 53, 111 connected to the working chamber passage 17, 106, an access port 54, 112 connected to the valve chamber passage 18, 107, an access port 55, 113 connected to the brake pipe passage 19, 108, an access port 56, 114 connected to the reservoir passage 20, 109, and an access port 57, 115 connected to the brake cylinder passage 21, 110.

The method may further include engaging the access interface 51, 105 with a testing device 150 for measuring the operational pressures of the plurality of passages 17, 18, 19, 20, 21, 106, 107, 108, 109, 110 via the plurality of access ports 53, 54, 55, 56, 57, 111, 112, 113, 114, 115.

Further non-limiting examples of the present disclosure will now be described in the following numbered clauses.

Clause 1: A distributor valve for a brake control system of a railway vehicle, wherein the distributor valve is connected to a brake pipe (14), a brake cylinder (15), and a reservoir (16) of the brake control system, the distributor valve comprising: a pipe bracket (11, 100); a main portion (12) mounted on the pipe bracket (11, 100); and a main line portion (13) mounted on the pipe bracket (11, 100), wherein the pipe bracket (11, 100) comprises a plurality of passages (17, 18, 19, 20, 21, 27, 106, 107, 108, 109, 110, 117, 120) defined therein and extending through the pipe bracket (11, 100), the plurality of passages (17, 18, 19, 20, 21, 27, 106, 107, 108, 109, 110, 117, 120) being configured to place the main portion (12) and the main line portion (13) in communication with each other and with the brake pipe (14), the brake cylinder (15), and the reservoir (16), wherein the plurality of passages (17, 18, 19, 20, 21, 27, 106, 107, 108, 109, 110, 117, 120) comprises a working chamber passage (17, 106) configured to place the main portion (12) in communication with the main line portion (13), a valve chamber passage (18, 107) configured to place the main portion (12) in communication with the main line portion (13), a brake pipe passage (19, 108) configured to place the main portion (12) and the main line portion (13) in communication with the brake pipe (14), a reservoir passage (20, 109) configured to place the main portion (12) in communication with the reservoir (16), a brake cylinder passage (21, 110) configured to place the main portion (12) and the main line portion (13) in communication with the brake cylinder (15), and at least one additional passage (27, 117, 120) configured to place the main portion (12) and the main line portion (13) in communication with each other, wherein the distributor valve further comprises an access interface (51, 105) comprising a plurality of access ports (53, 54, 55, 56, 57, 111, 112, 113, 114, 115), the plurality of access ports (53, 54, 55, 56, 57, 111, 112, 113, 114, 115) comprising an access port (53, 111) connected to the working chamber passage (17, 106), an access port (54, 112) connected to the valve chamber passage (18, 107), an access port (55, 113) connected to the brake pipe passage (19, 108), an access port (56, 114) connected to the reservoir passage (20, 109), and an access port (57, 115) connected to the brake cylinder passage (21, 110).

Clause 2: The distributor valve according to clause 1, wherein the access interface comprises an integral port interface (105) disposed on a side of the pipe bracket (100), wherein the plurality of access ports (111, 112, 113, 114, 115) is arranged within the integral port interface (105).

Clause 3: The distributor valve according to clause 2, wherein the integral port interface (105) is configured to be engaged by a testing device (150) for measuring operational pressures of the plurality of passages (106, 107, 108, 109, 110) in the pipe bracket (100) via the plurality of access ports (111, 112, 113, 114, 115).

Clause 4: The distributor valve according to clauses 2 or 3, wherein the main portion (12) and the main line portion (13) are mounted spaced apart on a side (101) of the pipe bracket (100) and the integral port interface (105) is disposed in a different side (104) of the pipe bracket (100) adjacent to the main portion (12).

Clause 5: The distributor valve according to clause 1, wherein the access interface (105) comprises a pressure access plate (51) disposed between the pipe bracket (11) and the main portion (12), wherein the plurality of access ports (53, 54, 55, 56, 57) are arranged in a face (52) of the pressure access plate (51).

Clause 6: The distributor valve according to clause 5, wherein the pressure access plate (51) comprises a plurality of internally segregated chambers (58, 59, 60, 61, 62) that provide for communication between the main portion (12), the pipe bracket (11), and the plurality of access ports (53, 54, 55, 56, 57) in the face (52) of the pressure access plate (51).

Clause 7: The distributor valve according to clause 6, wherein each of the internally segregated chambers (58, 59, 60, 61, 62) comprises openings (63, 64, 65, 66, 67) for communicating with a corresponding passage (17, 18, 19, 20, 21) in the main portion (12) and a corresponding one of the plurality of passages (17, 18, 19, 20, 21) in the pipe bracket (11).

Clause 8: The distributor valve according to any one of clauses 5-7, wherein the face (52) of the pressure access plate (51) is configured to be engaged by a testing device (150) for measuring operational pressures of the plurality of passages (17, 18, 19, 20, 21) in the pipe bracket (11) via the plurality of access ports (53, 54, 55, 56, 57).

Clause 9: A pipe bracket (100) for a distributor valve in a railway vehicle brake control system, wherein the pipe bracket (100) is connected to a brake pipe (14), a brake cylinder (15), and a reservoir (16) of the brake control system, and wherein the pipe bracket (100) is configured to have a main portion (12) and a main line portion (13) of the distributor valve mounted thereon, the pipe bracket (100) comprising: a plurality of passages (106, 107, 108, 109, 110, 117, 120) defined in the pipe bracket (100) and extending through the pipe bracket (100), the plurality of passages (106, 107, 108, 109, 110, 117, 120) being configured to place the main portion (12) and the main line portion (13) of the distributor valve in communication with each other and with the brake pipe (14), the brake cylinder (15), and the reservoir (16), wherein the plurality of passages (106, 107, 108, 109, 110, 117, 120) comprises a working chamber passage (106) configured to place the main portion (12) in communication with the main line portion (13), a valve chamber passage (107) configured to place the main portion (12) in communication with the main line portion (13), a brake pipe passage (108) configured to place the main portion (12) and the main line portion (13) in communication with the brake pipe (14), a reservoir passage (109) configured to place the main portion (12) in communication with the reservoir (16), a brake cylinder passage (110) configured to place the main portion (12) and the main line portion (13) in communication with the brake cylinder (15), and at least one additional passage (117, 120) configured to place the main portion (12) and the main line portion (13) in communication with each other; and an integral port interface (105) disposed on a side of the pipe bracket (100), the integral port interface (105) comprising a plurality of access ports (111, 112, 113, 114, 115) arranged therein, wherein the plurality of access ports (111, 112, 113, 114, 115) comprises an access port (111) connected to the working chamber passage (106), an access port (112) connected to the valve chamber passage (107), an access port (113) connected to the brake pipe passage (108), an access port (114) connected to the reservoir passage (109), and an access port (115) connected to the brake cylinder passage (110).

Clause 10: The pipe bracket (100) according to claim 9, wherein the integral port interface (105) is configured to be engaged by a testing device (150) for measuring operational pressures of the plurality of passages (106, 107, 108, 109, 110) in the pipe bracket (100) via the plurality of access ports (111, 112, 113, 114, 115).

Clause 11: The pipe bracket (100) according to clauses 9 or 10, wherein the pipe bracket (100) is configured to have the main portion (12) and the main line portion (13) mounted thereon spaced apart on a side (101) of the pipe bracket (100), and the integral port interface (105) is disposed on a different side (104) of the pipe bracket (100) adjacent to a mounting location (102) for the main portion (12).

Clause 12: A pressure access plate (51) configured to provide access to operational pressures in a distributor valve (50) of a railway brake control system, wherein the distributor valve (50) comprises a pipe bracket (11), a main portion (12) mounted on the pipe bracket (11), and a main line portion (13) mounted on the pipe bracket (11), wherein the distributor valve (50) is connected to a brake pipe (14), a brake cylinder (15), and a reservoir (16) of the brake control system, and wherein the pressure access plate (51) is configured to be mounted between the pipe bracket (11) and the main portion (12) of the distributor valve (50), the pressure access plate (51) comprising: a face (52) having a plurality of access ports (53, 54, 55, 56, 57) arranged therein; and a body having a plurality of internally segregated chambers (58, 59, 60, 61, 62) defined therein, each of the internally segregated chambers (58, 59, 60, 61, 62) being in communication with a corresponding access port (53, 54, 55, 56, 57) in the face (52), each of the chambers (58, 59, 60, 61, 62) comprising at least one opening (63, 64, 65, 66, 67) configured to place the chamber (58, 59, 60, 61, 62) in communication with a corresponding passage (17, 18, 19, 20, 21) of the main portion (12) and at least one opening (63, 64, 65, 66, 67) configured to place the chamber (58, 59, 60, 61, 62) in communication with a corresponding passage (17, 18, 19, 20, 21) of the pipe bracket (11), wherein the plurality of internally segregated chambers (58, 59, 60, 61, 62) comprises a first chamber (58) configured to communicate a working chamber passage (17) in the pipe bracket (11) with a working chamber access port (53) in the face (52) and a first passage (17) in the main portion (12), a second chamber (59) configured to communicate a valve chamber passage (18) in the pipe bracket (11) with a valve chamber access port (54) in the face (52) and a second passage (18) in the main portion (12), a third chamber (60) configured to communicate a brake pipe passage (19) in the pipe bracket (11) with a brake pipe access port (55) in the face (52) and a third passage (19) in the main portion (12), a fourth chamber (61) configured to communicate a reservoir passage (20) in the pipe bracket (11) with a reservoir access port (56) in the face (52) and a fourth passage (20) in the main portion (12), and a fifth chamber (62) configured to communicate a brake cylinder passage (21) in the pipe bracket (11) with a brake cylinder access port (57) in the face (52) and a fifth passage (21) in the main portion (12).

Clause 13: The pressure access plate (51) according to clause 12, wherein the face (52) of the pressure access plate (51) is configured to be engaged by a testing device (150) for measuring operational pressures of the plurality of passages (17, 18, 19, 20, 21) in the pipe bracket (11) via the plurality of access ports (53, 54, 55, 56, 57).

Clause 14: A method for accessing operational pressures in a distributor valve of a railway brake control system, wherein the distributor valve is connected to a brake pipe (14), a brake cylinder (15), and a reservoir (16) of the brake control system, wherein the distributor valve comprises a pipe bracket (11, 100), a main portion (12) mounted on the pipe bracket (11, 100), and a main line portion (13) mounted on the pipe bracket (11, 100), wherein the pipe bracket (11, 100) comprises a plurality of passages (17, 18, 19, 20, 21, 27, 106, 107, 108, 109, 110, 117, 120) defined therein and extending through the pipe bracket (11, 100), the plurality of passages (17, 18, 19, 20, 21, 27, 106, 107, 108, 109, 110, 117, 120) being configured to place the main portion (12) and the main line portion (13) in communication with each other and with the brake pipe (14), the brake cylinder (15), and the reservoir (16), and wherein the plurality of passages (17, 18, 19, 20, 21, 27, 106, 107, 108, 109, 110, 117, 120) comprises a working chamber passage (17, 106) configured to place the main portion (12) in communication with the main line portion (13), a valve chamber passage (18, 107) configured to place the main portion (12) in communication with the main line portion (13), a brake pipe passage (19, 108) configured to place the main portion (12) and the main line portion (13) in communication with the brake pipe (14), a reservoir passage (20, 109) configured to place the main portion (12) in communication with the reservoir (16), a brake cylinder passage (21, 110) configured to place the main portion (12) and the main line portion (13) in communication with the brake cylinder (15), and at least one additional passage (27, 117, 120) configured to place the main portion (12) and the main line portion (13) in communication with each other, the method comprising: providing an access interface (51, 105) comprising a plurality of access ports (53, 54, 55, 56, 57, 111, 112, 113, 114, 115) on the pipe bracket (11, 100), the plurality of access ports (53, 54, 55, 56, 57, 111, 112, 113, 114, 115) comprising an access port (53, 111) connected to the working chamber passage (17, 106), an access port (54, 112) connected to the valve chamber passage (18, 107), an access port (55, 113) connected to the brake pipe passage (19, 108), an access port (56, 114) connected to the reservoir passage (20, 109), and an access port (57, 115) connected to the brake cylinder passage (21, 110).

Clause 15: The method according to clause 14, wherein the access interface comprises an integral port interface (105) disposed on a side (104) of the pipe bracket (100), wherein the plurality of access ports (111, 112, 113, 114, 115) is arranged within the integral port interface (105).

Clause 16: The method according to clause 15, further comprising engaging the integral port interface (105) with a testing device (150) for measuring the operational pressures of the plurality of passages (106, 107, 108, 109, 110) in the pipe bracket (100) via the plurality of access ports (111, 112, 113, 114, 115).

Clause 17: The method according to clauses 15 or 16, wherein the main portion (12) and the main line portion (13) are mounted spaced apart on a side (101) of the pipe bracket (100) and the integral port interface (105) is disposed in a different side (104) of the pipe bracket (100) adjacent to the main portion (12).

Clause 18: The method according to clause 14, further comprising providing a pressure access plate (51) disposed between the pipe bracket (11) and the main portion (12) as the access interface (105), wherein the plurality of access ports (53, 54, 55, 56, 57) are arranged in a face (52) of the pressure access plate (51).

Clause 19: The method according to clause 18, wherein the pressure access plate (51) comprises a plurality of internally segregated chambers (58, 59, 60, 61, 62) that provide for communication between the main portion (12), the pipe bracket (11), and the plurality of access ports (53, 54, 55, 56, 57) in the face (52) of the pressure access plate (51).

Clause 20: The method according to clause 19, wherein each of the internally segregated chambers (58, 59, 60, 61, 62) comprises openings (63, 64, 65, 66, 67) for communicating with a corresponding passage (17, 18, 19, 20, 21) in the main portion (12) and a corresponding one of the plurality of passages (17, 18, 19, 20, 21) in the pipe bracket (11).

Clause 21: The method according to clauses 18 or 19, further comprising engaging the face (52) of the pressure access plate (51) with a testing device (150) for measuring the operational pressures of the plurality of passages (17, 18, 19, 20, 21) in the pipe bracket (11) via the plurality of access ports (53, 54, 55, 56, 57).

It is to be understood that the invention may assume various alternative variations and step sequences, except where expressly specified to the contrary. It is also to be understood that the specific devices and processes illustrated in the attached drawings, and described in the specification, are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

The invention claimed is:

1. A distributor valve for a brake control system of a railway vehicle, wherein the distributor valve is connected to a brake pipe, a brake cylinder, and a reservoir of the brake control system, the distributor valve comprising:
    a pipe bracket;
    a main portion mounted on the pipe bracket; and
    a main line portion mounted on the pipe bracket,
    wherein the pipe bracket comprises a plurality of passages defined therein and extending through the pipe bracket, the plurality of passages being configured to place the main portion and the main line portion in communication with each other and with the brake pipe, the brake cylinder, and the reservoir,
    wherein the plurality of passages comprises a working chamber passage configured to place the main portion in communication with the main line portion, a valve chamber passage configured to place the main portion in communication with the main line portion, a brake pipe passage configured to place the main portion and the main line portion in communication with the brake pipe, a reservoir passage configured to place the main portion in communication with the reservoir, a brake cylinder passage configured to place the main portion and the main line portion in communication with the brake cylinder, and at least one additional passage configured to place the main portion and the main line portion in communication with each other, wherein the distributor valve further comprises an access interface comprising a plurality of access ports, the plurality of access ports comprising an access port connected to the working chamber passage, an access port connected to the valve chamber passage, an access port connected to the brake pipe passage, an access port connected to the reservoir passage, and an access port connected to the brake cylinder passage.

2. The distributor valve according to claim 1, wherein the access interface comprises an integral port interface disposed on a side of the pipe bracket, wherein the plurality of access ports is arranged within the integral port interface.

3. The distributor valve according to claim 2, wherein the integral port interface is configured to be engaged by a testing device for measuring operational pressures of the plurality of passages in the pipe bracket via the plurality of access ports.

4. The distributor valve according to claim 2, wherein the main portion and the main line portion are mounted spaced apart on a side of the pipe bracket and the integral port interface is disposed in a different side of the pipe bracket adjacent to the main portion.

5. The distributor valve according to claim 1, wherein the access interface comprises a pressure access plate disposed between the pipe bracket and the main portion, wherein the plurality of access ports are arranged in a face of the pressure access plate.

6. The distributor valve according to claim 5, wherein the pressure access plate comprises a plurality of internally segregated chambers that provide for communication between the main portion, the pipe bracket, and the plurality of access ports in the face of the pressure access plate.

7. The distributor valve according to claim 6, wherein each of the internally segregated chambers comprises openings for communicating with a corresponding passage in the main portion and a corresponding one of the plurality of passages in the pipe bracket.

8. The distributor valve according to claim 5, wherein the face of the pressure access plate is configured to be engaged by a testing device for measuring operational pressures of the plurality of passages in the pipe bracket via the plurality of access ports.

9. A pipe bracket for a distributor valve in a railway vehicle brake control system, wherein the pipe bracket is connected to a brake pipe, a brake cylinder, and a reservoir of the brake control system, and wherein the pipe bracket is configured to have a main portion and a main line portion of the distributor valve mounted thereon, the pipe bracket comprising:

a plurality of passages defined in the pipe bracket and extending through the pipe bracket, the plurality of passages being configured to place the main portion and the main line portion of the distributor valve in communication with each other and with the brake pipe, the brake cylinder, and the reservoir, wherein the plurality of passages comprises a working chamber passage configured to place the main portion in communication with the main line portion, a valve chamber passage configured to place the main portion in communication with the main line portion, a brake pipe passage configured to place the main portion and the main line portion in communication with the brake pipe, a reservoir passage configured to place the main portion in communication with the reservoir, a brake cylinder passage configured to place the main portion and the main line portion in communication with the brake cylinder, and at least one additional passage configured to place the main portion and the main line portion in communication with each other; and an integral port interface disposed on a side of the pipe bracket, the integral port interface comprising a plurality of access ports arranged therein, wherein the plurality of access ports comprises an access port connected to the working chamber passage, an access port connected to the valve chamber passage, an access port connected to the brake pipe passage, an access port connected to the reservoir passage, and an access port connected to the brake cylinder passage.

10. The pipe bracket according to claim 9, wherein the integral port interface is configured to be engaged by a testing device for measuring operational pressures of the plurality of passages in the pipe bracket via the plurality of access ports.

11. The pipe bracket according to claim 9, wherein the pipe bracket is configured to have the main portion and the main line portion mounted thereon spaced apart on a side of the pipe bracket, and the integral port interface is disposed on a different side of the pipe bracket adjacent to a mounting location for the main portion.

12. A pressure access plate configured to provide access to operational pressures in a distributor valve of a railway brake control system, wherein the distributor valve comprises a pipe bracket, a main portion mounted on the pipe bracket, and a main line portion mounted on the pipe bracket, wherein the distributor valve is connected to a brake pipe, a brake cylinder, and a reservoir of the brake control system, and wherein the pressure access plate is configured to be mounted between the pipe bracket and the main portion of the distributor valve, the pressure access plate comprising:

a face having a plurality of access ports arranged therein; and a body having a plurality of internally segregated chambers defined therein, each of the internally segregated chambers being in communication with a corresponding access port in the face, each of the chambers comprising at least one opening configured to place the chamber in communication with a corresponding passage of the main portion and at least one opening configured to place the chamber in communication with a corresponding passage of the pipe bracket, wherein the plurality of internally segregated chambers comprises a first chamber configured to communicate a working chamber passage in the pipe bracket with a working chamber access port in the face and a first passage in the main portion, a second chamber configured to communicate a valve chamber passage in the pipe bracket with a valve chamber access port in the face and a second passage in the main portion, a third chamber configured to communicate a brake pipe passage in the pipe bracket with a brake pipe access port in the face and a third passage in the main portion, a fourth chamber configured to communicate a reservoir passage in the pipe bracket with a reservoir access port in the face and a fourth passage in the main portion, and a fifth chamber configured to communicate a brake cylinder passage in the pipe bracket with a brake cylinder access port in the face and a fifth passage in the main portion.

13. The pressure access plate according to claim 12, wherein the face of the pressure access plate is configured to be engaged by a testing device for measuring operational pressures of the plurality of passages in the pipe bracket via the plurality of access ports.

14. A method for accessing operational pressures in a distributor valve of a railway brake control system, wherein the distributor valve is connected to a brake pipe, a brake cylinder, and a reservoir of the brake control system, wherein the distributor valve comprises a pipe bracket, a main portion mounted on the pipe bracket, and a main line portion mounted on the pipe bracket, wherein the pipe bracket comprises a plurality of passages defined therein and extending through the pipe bracket, the plurality of passages being configured to place the main portion and the main line portion in communication with each other and with the brake pipe, the brake cylinder, and the reservoir, and wherein the plurality of passages comprises a working chamber passage configured to place the main portion in communication with the main line portion, a valve chamber passage configured to place the main portion in communication with the main line portion, a brake pipe passage configured to place the main portion and the main line portion in communication with the brake pipe, a reservoir passage configured to place the main portion in communication with the reservoir, a brake cylinder passage configured to place the main portion and the main line portion in communication with the brake cylinder, and at least one additional passage configured to place the main portion and the main line portion in communication with each other, the method comprising:

providing an access interface comprising a plurality of access ports on the pipe bracket, the plurality of access ports comprising an access port connected to the working chamber passage, an access port connected to the valve chamber passage, an access port connected to the brake pipe passage, an access port connected to the reservoir passage, and an access port connected to the brake cylinder passage.

15. The method according to claim 14, wherein the access interface comprises an integral port interface disposed on a side of the pipe bracket, wherein the plurality of access ports is arranged within the integral port interface.

16. The method according to claim 15, further comprising engaging the integral port interface with a testing device for measuring the operational pressures of the plurality of passages in the pipe bracket via the plurality of access ports.

17. The method according to claim 15, wherein the main portion and the main line portion are mounted spaced apart on a side of the pipe bracket and the integral port interface is disposed in a different side of the pipe bracket adjacent to the main portion.

18. The method according to claim 14, further comprising providing a pressure access plate disposed between the pipe bracket and the main portion as the access interface, wherein the plurality of access ports are arranged in a face of the pressure access plate.

19. The method according to claim 18, wherein the pressure access plate comprises a plurality of internally segregated chambers that provide for communication between the main portion, the pipe bracket, and the plurality of access ports in the face of the pressure access plate.

20. The method according to claim 19, wherein each of the internally segregated chambers comprises openings for communicating with a corresponding passage in the main portion and a corresponding one of the plurality of passages in the pipe bracket.

21. The method according to claim 18, further comprising engaging the face of the pressure access plate with a testing device for measuring the operational pressures of the plurality of passages in the pipe bracket via the plurality of access ports.

* * * * *